United States Patent
Hogan et al.

(10) Patent No.: US 6,399,692 B2
(45) Date of Patent: *Jun. 4, 2002

(54) ELECTRICAL CONDUCTIVITY OF SILICA-FILLED RUBBER COMPOSITIONS USING ALKALI METAL SALTS DISSOLVED IN POLY (ALKYLENE OXIDE) COMPOUNDS

(75) Inventors: Terrence E. Hogan, Cuyahoga Falls; William L. Hergenrother, Akron; Mario DeTrano, Massillon, all of OH (US)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/306,586

(22) Filed: May 6, 1999

(51) Int. Cl.[7] .............................. C08J 3/00; C08K 3/34; C08K 3/40; C08K 3/04; C08L 9/00
(52) U.S. Cl. .................... 524/494; 152/151; 152/152.1; 152/DIG. 2; 264/501; 524/366; 524/368; 524/376; 524/377; 524/492; 524/493; 524/495; 524/496
(58) Field of Search .................. 524/366, 358, 524/376, 377, 492, 493, 494, 495, 496; 264/501; 152/151, 152.1, DIG. 2

(56) References Cited

U.S. PATENT DOCUMENTS

| | | | |
|---|---|---|---|
| 5,077,330 A | * 12/1991 | Ehrhart et al. | ............... 524/314 |
| 5,518,055 A | 5/1996 | Teeple et al. | ............. 152/152.1 |
| 5,714,533 A | 2/1998 | Hatakeyama et al. | ....... 524/140 |
| 5,853,461 A | * 12/1998 | Wagner | ......................... 106/2 |

FOREIGN PATENT DOCUMENTS

| | | | | |
|---|---|---|---|---|
| CA | 2249892 | 4/1999 | ........... | C08L/23/06 |
| DE | 197 26 728 | 1/1999 | ......... | C08L/101/12 |
| EP | 0 732 229 A1 | 3/1995 | ........... | B60C/19/08 |
| EP | 0 681 931 A1 | 5/1995 | ........... | B60C/19/08 |
| EP | 0 705 722 A1 | 9/1995 | ........... | B60C/19/08 |
| EP | 0 718 126 A2 | 12/1995 | ........... | B60C/19/08 |
| EP | 0 754 574 A2 | 7/1996 | ........... | B60C/11/00 |

OTHER PUBLICATIONS

Polymer Journal "Ionic Conductivity of Solid Polymer Electrolytes Based on Modified Alternating Maleic Anhydride Copolymer with Oligo (oxyethylene) Side Chains" vol. 29, No. 5, pp. 410–416 (1997).

* cited by examiner

Primary Examiner—Patrick D. Niland
(74) Attorney, Agent, or Firm—Meredith E. Palmer; Rodney Skoglund

(57) ABSTRACT

A tire tread composition comprising 100 parts by weight of a vulcanizable elastomer suitable for use in a tire; from about 1 to about 100 parts by weight of a silica reinforcing filler, per 100 parts of the elatomer; and from about 0.1 to 15 parts by weight of an electrically conductive additive containing a poly(alkylene oxide)-containing polymer having a alkali metal salt dissolved therein, per 100 parts of the elastomer provides improved electrical conductivity properties. A pneumatic tire having improved electrostatic dissipation employing the tire tread composition described above and a related method for dissipating electrostatic charges from tires using the tread composition is also discussed.

22 Claims, No Drawings

ELECTRICAL CONDUCTIVITY OF SILICA-FILLED RUBBER COMPOSITIONS USING ALKALI METAL SALTS DISSOLVED IN POLY (ALKYLENE OXIDE) COMPOUNDS

TECHNICAL FIELD

This invention generally relates to silica-filled rubber compositions and, more particularly, to silica-filled rubber compositions containing poly(alkylene oxide) compounds having alkali metal salts dissolved therein to improve the electrical conductivity of the rubber compositions. These rubber compositions are particularly useful in tires as silica-reinforced tread compositions and are particularly suitable for preventing or dissipating any electrostatic charges which might accumulate in the tire. The invention also relates to a method for dissipating electrostatic charges in silica-filled rubber compositions and, more particularly, for preventing the accumulation of electrostatic charges in tires having silica-reinforced tread compositions.

BACKGROUND OF THE INVENTION

It is known that electrostatic charges may be produced by any of a number of different ways within a motor vehicle. For instance, the mechanical and electrical components operating within a motor vehicle such as, for example, a rotating shaft within a bearing, can result in an electrostatic charge being generated within the vehicle, or even the friction of the rubber tire rolling on the road can generate an electrostatic charge. Typically, these charges are dissipated through the rubber tires that contact the ground since the tires typically include a sufficient amount of electrically conductive materials therein. Were such dissipation not to occur, interference with electronic components within the motor vehicle could occur. Furthermore, static shock could be experienced by the vehicle's passengers as they exit the vehicle. Such high electric charges can also lead to safety hazards upon refueling of the vehicle.

Although rubber tires have typically acted as an adequate conduit for the dissipation of such static charges produced from the mechanical or electrical components of a motor vehicle, the use of less conductive materials within tires has resulted in a decrease in the ability of the tires to effectively dissipate these static charges. This is particularly true in rubber tire compositions employing silica as a reinforcing filler. The advantages of silica-filled tires are well known in the art as silica has been found to provide excellent wet traction, excellent wear, and low rolling resistance in tires, while reducing hysteresis.

Inasmuch as silica-filled tires are advantageous, attempts have been made to produce tires, and particularly, tire tread compositions, that are silica filled, or at least partially silica filled and yet, adequately dissipate static electricity.

Initial attempts at increasing the conductivity of tires, including those having silica-filled tread compositions, have focused on the use of electro-mechanical means as an alternative conduit for dissipating the electrostatic charges. For example, U.S. Pat. No. 5,518,055 teaches a tire having an electrostatic discharge ring positioned on at least one shoulder of the tire. The discharge ring has a relatively low volume resistivity, which is on the order of 100 megohm cm. The discharge ring is critically positioned so as to contact the ground surface and dissipate static charge built-up within the inner portions of the tire. Likewise, European Patent Application Nos. 681,931 A1 and 718,126 A2 teach tires or tire treads having a thin conductive layer on the outermost portion of the tread. In one case, the thin layer extends continuously in a circumferential direction over the tire tread; and in another embodiment the conductive portion has a width that is 15 percent of the tire strip width.

European Patent Application Nos. 0 705 722 A1 and 0 732 229 A1 teach silica reinforced rubber treads that contain a thin overcoat or cap, containing a quantitative amount of electrically conductive carbon black. In one embodiment, the outer top cap extends across the outer surface of the tread and in an alternative embodiment the outer cap extends only over the outer portion or peripheral edges of the tread surface that is intended to be contacted with the ground.

Similarly, European Patent Application Nos. 0 718 127 A1 and 0 747 243 A1 teach tires having one or more tread strips that provide ground contact and that are electrically conductive. These strips also extend radially inwardly to contact the body plies of the tire or the tire bead area.

More recently, attempts have been made which employ chemical additives to improve the electrical conductivity of the rubber compounds. For example, nonionic surfactants or phosphoric esters have been used in rubber tire compounds to improved electrical conductivity. In U.S. Pat. No. 5,714,533, a rubber composition having improved conductivity properties is disclosed which includes a rubber component, a filler such as silica, and a nonionic surfactant or phosphoric ester. Typical examples of the nonionic surfactant are adducts of ethylene oxide of 2 to 30 moles to linear, cyclic or branched, and saturated or unsaturated, and monohydric or polyhydric aliphatic alcohol having carbon atoms of 6 to 25, or adducts of ethylene oxide of 2 to 30 moles to alkylphenol, while representative phosphoric esters include those represented by the following formula (I) and (II):

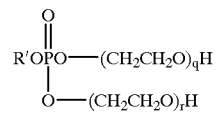

(I)

wherein R' represents a linear or branched, and saturated or unsaturated aliphatic hydrocarbon group having 8 to 25 carbon atoms or an aryl group; and q and r each are an integer satisfying a relation of q+r=1 to 30, or

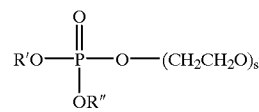

(II)

wherein R' and R" each represent a linear or branched, and saturated or unsaturated aliphatic hydrocarbon group having 8 to 25 carbon atoms or and aryl group and may be the same or different; and s is an integer of 1 to 30.

Addition of other chemical ingredients, such as carbon black fibers or ultra fine carbon fibrils, have been reported to provide superior reinforcing and electrical conductivity compared to compounds with conventional carbon black reinforcing fillers.

Still further, it is believed that other chemical additives, namely polyoxyethylene deriviatives of phenol, commercially available under the trade name "Triton", have been tested as electrically conductive additives. However, it has been found that the use of poly(alkylene oxide) derivatives alone do not provide a significant antistatic effect (as noted in Col. 7, lines 40–46 of U.S. Pat. No. 5,714,533) or, if they are able to provide the desired effect, quickly bleed out of the rubber.

Thus, a need continues to exist for an effective silica-reinforced tread composition, which will dissipate electrostatic charges while maintaining or improving upon the physical properties currently associated with silica-filled tire tread compositions and which will not bleed out of the composition. It is further desired that the means by which electrical conductivity of the tread composition is improved also act as a dispersing agent for the silica.

SUMMARY OF INVENTION

It is therefore, an object of the present invention to provide a silica-reinforced rubber composition having adequate electrostatic dissipation properties.

It is another object of the present invention to provide a silica-reinforced rubber composition, as above, suitable for use in a tread composition of a tire.

It is yet another object of the present invention to provide the rubber composition, as above, wherein the means used to increase the electrical conductivity of the rubber composition further acts as a dispersing agent for the silica.

It is still another object of the present invention to provide a rubber composition containing an additive which will not bleed out of the composition.

It is a further object of the present invention to provide tires having improved electrostatic dissipation properties.

It is still a further object of the present invention to provide a method for the dissipation of electrostatic charges in tires having silica-reinforced tread compositions.

At least one or more of the foregoing objects, together with the advantages thereof over the known art relating to silica reinforced tires or tire treads having adequate electrostatic dissipation properties, which shall become apparent from the specification that follows, are accomplished by the invention as hereinafter described and claimed.

In general, the present invention provides a tire tread composition having improved electrical conductivity properties comprising 100 parts by weight of a vulcanizable elastomer suitable for use in a tire; from about 1 to about 100 parts by weight of a silica reinforcing filler, per 100 parts of the elastomer; and from about 0.1 to about 15 parts by weight of an electrically conductive additive containing a poly(alkylene oxide)-containing polymer having an alkali metal salt dissolved therein, per 100 parts of the elastomer.

The present invention also includes tires having improved electrostatic dissipation employing a tire tread composition comprising 100 parts by weight of a vulcanizable elastomer suitable for use in the manufacture of the tire tread composition; from about 1 to about 100 parts by weight of a silica reinforcing filler, per 100 parts of the elastomer; and from about 0.1 to about 15 parts by weight of an electrically conductive additive containing a poly(alkylene oxide)-containing polymer having an alkali metal salt dissolved therein, per 100 parts of the elastomer.

Still further, the present invention includes a method of dissipating electrostatic charge from pneumatic tires comprising the step of applying to a tire carcass prior to curing, a composite tread, the tread providing a tread pattern and having a road engaging surface, the composite tread comprising 100 parts by weight of a vulcanizable elastomer suitable for use in the manufacture of the tire; from about 1 to about 100 parts by weight of a silica reinforcing filler, per 100 parts of the elastomer; and from about 0.1 to 15 parts by weight of an electrically conductive additive containing a poly(alkylene oxide)-containing polymer having an alkali metal salt dissolved therein, per 100 parts of the elastomer, whereby at least a portion of the tread is engaged with roadway surfaces encountered during use of the tire to dissipate the electrostatic charge.

PREFERRED EMBODIMENT FOR CARRYING OUT THE INVENTION

The present invention is directed toward the use of a small amount of an additive suitable for improving the electrical conductivity of a filler-reinforced tire tread composition. It is known that reinforcing fillers such as carbon black and silica increase the modulus of the elastomeric polymers to which they are added. To be effective, a good bond must be effected between the polymer (rubber) and the filler, which is referred to as bound rubber. While silica is particularly effective as a reinforcing filler, by reducing the hysteresis of the rubber into which it is incorporated, it has also been found that silica-filled vulcanizable rubber tread compounds in particular do not adequately dissipate the static charges built up when the vehicle is in motion. The present invention seeks to dissipate these electrostatic charges by incorporating into the silica-filled rubber composition, preferably used as a tire tread composition, a small amount of a poly(alkylene oxide)-containing polymer having a alkali metal salt dissolved therein which has been found to improve the electrical conductivity of the rubber composition. It has been found that by adding from about 0.1 to about 15 parts by weight of this type of electrically conductive additive, per 100 parts by weight rubber (phr) into the tire tread rubber formulation, a significant increase (by about two orders of magnitude) in electrical conductivity of the silica-filled stock is obtained without an appreciable compromise in the physical properties of the cured treads and the performance of the tires produced with such treads. In addition, it has been found this additive may further act as a dispersing agent for the silica.

Still further, in cases where carbon black has been finely dispersed, an appreciable loss of electrical conductivity in the carbon black-filled composition may be noticed. It is believed that the use of these electrically conductive additives will also increase the conductivity of well-dispersed carbon black within the tire tread composition such that other technical improvements associated with the use of well-dispersed carbon black -can be made.

The term "phr" as used throughout the specification, and according to the conventional practice in the art, refers to parts of a respective material "per 100 parts by weight of rubber or elastomer." It will further be appreciated that the terms "rubber" and "elastomer," as used throughout the specification, may be used interchangably, unless otherwise prescribed, and generally refer to the rubber or polymer matrix which has been compounded, blended or mixed with various materials. Such terms are believed to be widely known by those having skill in the rubber mixing and rubber compounding art.

Typically, in the formulation of vulcanizable rubber compounds for tread stocks, a polymerized elastomer, e.g., polybutadiene, polyisoprene and the like, and copolymers and terpolymers thereof with monovinyl aromatics such as styrene, alpha methyl styrene and the like, or trienes such as myrcene, is compounded to form the rubber stock. Thus, the elastomers include diene homopolymers, A, and copolymers and terpolymers thereof with monovinyl aromatic polymers, B. Exemplary diene homopolymers are those prepared from diolefin monomers having from 4 to about 12 carbon atoms. Exemplary vinyl aromatic polymers are those prepared from monomers having from 8 to about 20 carbon atoms.

Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, α-methylstyrene, p-methylstyrene, vinyltoluenes and vinyinaphthalenes. The conjugated diene monomer and aromatic vinyl monomer are normally used at the weight ratios of about 90:10 to about 55:45, preferably about 80:20 to about 65:35.

Preferred elastomers include diene homopolymers such as polybutadiene and polyisoprene, and copolymers such as styrene butadiene rubber (SBR). Copolymers can be comprised of about 99 to 55 percent by weight of diene units and from about 1 to about 45 percent by weight of monovinyl aromatic or triene units, totaling 100 percent. The polymers and copolymers of the present invention may have 1,2-microstructure contents ranging from about 10 to about 80 percent, with the preferred polymers or copolymers having 1,2-microstructure contents of from about 25 to 65 percent, based upon the diene content. The molecular weight of the polymer that is produced according to the present invention, is preferably such that a proton-quenched sample will exhibit a gum Mooney viscosity ($ML_4/212°$ F.) of from about 2 to about 150. The copolymers and terpolymers are preferably random polymers which result from simultaneous copolymerization of the monomers, as is known in the art. Also included are non-functionalized cis-polybutadiene, ethylene-propylene-diene monomer (EPDM), emulsion styrene butadiene rubber, styrene isoprene butadiene rubber (SIB) and natural rubber.

The above-described copolymers and terpolymers of conjugated dienes and their method of preparation are well known in the rubber and polymer arts. Many of the polymers are commercially available. It is to be understood that practice of the present invention is not to be limited to any particular rubber included hereinabove or excluded.

In addition, it has also been discovered that in order to increase the bonding between the rubber and the reinforcing fillers, the rubber polymer(s) can be functionalized with various groups. These groups can be introduced during polymer initiation, as well as at termination and accordingly, it is known to provided polymers functionalized at one or both ends of the polymer chain. Examples of functionalized rubber polymers and their related methods are the subject of several U.S. patents, owned by the Assignee of record, such as U.S. Pat. No. 5,866,650, the subject matter of which is incorporated herein by reference. It is also known to provide functional groups along the polymer chain. In the practice of the present invention, the use of any of the foregoing functionalized polymers is preferred, but not required. For example, when mineral fillers, in addition to silica and/or carbon black, are used in the composition, it is preferred that the polymer contain a silane functionality, such as residual terminal silylethoxy or methylsilylphenoxy groups obtained by the use of a tetraethoxysilane or methyltriphenoxysilane terminator.

The elastomeric polymers can be utilized as 100 parts of the rubber in the treadstock compound or, they can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), including emulsion SBR's, polybutadiene, butyl rubber, neoprene, ethylene/propylene rubber, ethylenelpropylene/diene rubber (EPDM), styrene isoprene butadiene rubber (SIB), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the functionalized polymers are blended with conventional rubbers, the amounts can vary widely within a range comprising about 5 to about 99 percent by weight of the total rubber, with the conventional rubber or rubbers making up the balance of the total rubber (100 parts). It is to be appreciated that the minimum amount will depend primarily upon the degree of reduced hysteresis that is desired.

Reinforcing fillers can be employed in the tread composition in amounts ranging from about 5 to about 100 parts by weight, per 100 parts by weight of the elastomer (phr). Generally, there are two preferred types of reinforcing fillers, carbon black and silica, and these fillers can be used separately within a treadstock composition or in combination with each other. These filler materials are seen as being low hysteresis filler materials. While other reinforcing fillers known in the art may also be employed in the present invention, their usefulness and relationship to the electrically conductive additives discussed herein do not affect the essential nature of the invention.

Silica can be employed in the amount of about 1 part to about 100 parts by weight per 100 parts of rubber polymer (phr), preferably in an amount from about 5 to about 80 phr, and most perferably, in an amount of from about 5 to 30 phr. The useful upper range may be limited by the high viscosity imparted by fillers of this type. Some of the commercially available silicas which may be used include: Hi-Sil® 215, Hi-Sil® 233, and Hi-Sil® 190, produced by PPG Industries. Also, a number of useful commercial grades of different silicas are available from De Gussa Corporation, Rhone Poulenc, and J.M. Huber Corporation.

In a preferred embodiment, amorphous silica (silicon dioxide) is utilized as a filler for the diene polymer or copolymer elastomer-containing treadstock composition. Silicas are generally classed as wet-process, hydrated silicas because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should preferably range from about 32 to about 400 $m^2/g$, with the range of about 100 to about 250 $m^2/g$ being more preferred, and the range of about 150 to about 220 $m^2/g$ being most preferred. The pH of the silica filler is generally about 5.5 to about 7 or slightly over, preferably about 5.5 to about 6.8.

Although the vulcanizable elastomeric tread compounds of the present invention are primarily silica-filled, the polymers can be optionally compounded with all forms of carbon black in amounts ranging from 0 to about 80 parts by weight, per 100 parts of rubber (phr), with about 1 to about 40 phr being preferred. When carbon black is present, with silica, the amount of silica can be decreased to as low as about one phr, otherwise it too is present alone in at least 5 phr. Similarly, when both silica and carbon black are present, the amount of carbon black can be as low as about one phr or less, but sufficient silica should be present such that at least about 5 phr of the reinforcing fillers are present.

As is known to those skilled in the art, elastomeric compounds as are discussed herein are typically filled to a volume fraction of from about 5 to about 25 percent which is the total volume of filler(s) added divided by the total volume of the elastomeric stock. Accordingly, while the minimum amounts expressed herein are operable, a preferred and useful range of reinforcing fillers i.e., silica and carbon black, is about 30 to 100 phr.

The carbon blacks may include any of the commonly available, commercially-produced carbon blacks but those having a surface area (EMSA) of at least 20 $m^2$/gram and more preferably at least 35 $m^2$/gram up to 200 $m^2$/gram or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in TABLE I hereinbelow.

TABLE I

CARBON BLACKS

| ASTM Designation (D-1765-82a) | Surface Area ($m^2$/gram) (D-3765) |
|---|---|
| N-110 | 126 |
| N-220 | 111 |
| N-339 | 95 |
| N-330 | 83 |
| N-351 | 74 |
| N-550 | 42 |
| N-660 | 35 |

The carbon blacks utilized in the preparation of the elastomer compositions of the present invention may be in pelletized form or an unpelletized flocculent mass. Preferably, for more uniform mixing, unpelletized carbon black is preferred.

Particularly useful is FEF (fast extrusion furnace) black, a relatively high structure and large particle size carbon black, namely 40 mm, 40 $m^2$/g, particle size and surface area, respectively. Further discussions of such carbon blacks can be found in the literature. See, for example, *The Vanderbilt Rubber Handbook*, pp. 408–424, RT Vanderbilt Co., Norwalk, Conn. 06855 (1979) and *Rubber Technology*, 2d ed., pp. 51–59, Van Nostrand Reinhold Corporation (1973).

As noted hereinabove, one or more additives are included in the tire tread composition to provide improved electrical conductivity thereto. Generally, these polymeric additives are poly(alkylene oxide)-containing polymers having an alkali metal salt dissolved therein. By the term "dissolved", it is meant that the salt has been essentially uniformly dispersed in the polymer and is no longer in crystalline form.

Essentially any poly(alkylene oxide) polymer/alkali metal salt additive could be used in the present invention. More particularly, the additive is a comb polymer containing poly(alkylene oxide) side chains impregnated with the alkali metal salt. These additives are preferably added to the tire tread composition in relatively small amounts of from about 0.1 to about 15 parts by weight, per 100 parts of rubber (phr) and preferably have a number average molecular weight of at least about 100,000, and more preferably, at least about 1,000,000. It will be appreciated that, while ionically conducting comb polymers impregnated with metal salts have been used in the past as a polymer electrolyte solution in batteries and the like, these materials have not heretofore been compounded and used in tire tread formulations to generate a modified rubber stock with higher electrical conductivity.

Preferred alkali metal salts include the lithium salts. More preferred are lithium tetraflouroborate ($LiBF_4$) and lithium chloride (LiCl). It will be appreciated that the mole ratio of cations (e.g., Li+) of the salt employed to the alkylene oxide monomers employed as discussed below is preferably about 0.01 to about 0.2 and, more preferably, from about 0.05 to about 0.07.

While essentially any poly(alkylene oxide)-containing polymer may be employed, together with the alkali metal salt, to form the electrically conductive additive required according to the concepts of the present invention, preferred polymers include either comb polymers formed from the polymerization of unsaturation (e.g., vinyl) end-capped poly(alkylene oxide) copolymers or grafted polymers containing poly(alkylene oxide).

The unsaturation end-capped poly(alkylene oxide) copolymers preferably include a low molecular weight (i.e., less than about 20,000 $MW_n$) unsaturation end-capped poly(alkylene oxide) polymer which is polymerized to form a high molecular weight (i.e., at least about 100,000 $MW_n$) polymer suitable to provide a comb polymer having poly(alkylene oxide) side chains. By the term "unsaturation end-capped," it is meant that the polymer has been functionalized with a unsaturation group at one of its ends. Preferred unsaturation groups suitable for use in the polymer includes those selected from the group consisting of vinyl, acrylate, methacrylate, and fumerate, just to name a few. Most preferred is vinyl end-capped poly(alkylene oxide) copolymer.

The other preferred polymers are the grafted polymers containing poly(alkylene oxide). It has been found that low molecular weight poly(alkylene oxides), either with or without dissolved alkali metal salts, bleed out of the rubber composition at about 4 phr or higher concentrations. In order to overcome this problem, a maleic anhydride-containing polymer can be reacted with the poly(alkylene oxide)-containing polymer to provide the desired grafted polymer.

More particularly, the poly(alkylene oxide) portion of the grafted polymer should have a low enough molecular weight to prevent it from crystallizing at use temperatures and increase the mobility of the alkali metal salt ions. Therefore, the poly(alkylene oxide)-containing polymer should preferably have a number average molecular weight of between about 100 and about 20,000, and more preferably from about 100 to about 10,000 and most preferably, from about 200 to about 1000, prior to being reacted with the maleic anhydride-containing polymer. Conversely, however, this low molecular weight tends to cause the poly(alkylene oxide)-containing polymer to bleed out of the rubber. Consequently, a maleic anhydride-containing polymer preferably having a number average molecular weight of at least 100,000, prior to any reaction, is preferably reacted with the poly(alkylene oxide)-containing polymer, the reaction product thereof having an alkali metal (e.g., lithium) salt dissolved therein.

The poly(alkylene oxide)-containing polymers of the present invention are preferably selected from the group consisting of monohydroxy poly(alkylene oxide) polymers and aziridine end-capped poly(alkylene oxide) polymers, and more preferably, include poly(ethylene oxide), poly (propylene oxide), poly(tetrahydro furan) and block and random copolymers thereof, and aliphatic and aromatic ether derivatives and fatty acid ester derivatives thereof. When reacted with a maleic anhydride-containing polymer, the monohydroxy poly(alkylene oxide) polymers, in combination with the maleic anhydride-containing polymers, from poly(alkylene oxide) ester comb polymers wherein the poly(alkylene oxides) portions are side chains thereon.

The maleic anhydride-containing polymers employed may be any of a number of different polymers including poly(alkylvinylether-co-maleic anhydride), poly(styrene-co-maleic anhydride), poly(substituted styrene-co-maleic anhydride), and poly(α-olefin-co-maleic anhydride). Preferably, maleic anhydride constitutes at least about 10 weight percent of the maleic anhydride-containing polymer.

The subject electrically conductive additives may be synthesized by any means known in the art. Generally, however, the additive can be prepared at a temperature of about 100° C. in a Brabender by mixing a poly(alkylene oxide)/maleic anhydride-containing polymer with an alkali metal salt. The poly(alkylene oxide)/maleic anhydride-containing portion preferably includes a polyethylene glycol or polypropylene glycol segment as a homo-polyether, an organic polyol modified with the polyether, and a hydrocarbon polymer grafted with polyether, or comb polymers with oligo-oxyalkylene side chains.

In a preferred embodiment, a poly(methylvinyl ether-alt-maleic anhydride)-g-poly(ethylene glycol) methyl ether/lithium tetraflouroborate additive is synthesized by first adding about 20 to about 30 percent by weight of poly (methylvinyl ether-alt-maleic anhydride) having a number average molecular weight of about 1,130,000 to a Brabender preheated to about 139° C. Rotor speed may be set to about 80 rpm. After about 1 minute, about 60 to about 70 percent by weight of poly(ethylene glycol) monomethyl ether having a molecular weight of about 350 can be added to the Brabender and allowed to mix for another six minutes or so at 80 rpm. After this, about 1 to about 10 percent by weight of lithium tetraflouroborate (Aldrich, 98%) can be added and mixed in the Brabender for another eight minutes or so at 80 rpm to produce the resultant additive, a clear brown material. It will be appreciated that the poly(alkylene oxide) ether is used in excess to order to assure complete use of the lithium salt.

In another alternative embodiment, poly (methylvinylether-alt-maleic anhydride)-g-poly(ethylene glycol) methyl ether/lithium chloride additive can be synthesized by initially preheating the Brabender to about 100° C. and adding about 20 to about 30 weight percent of poly(methylvinylether-aft-maleic anhydride) having a number average molecular weight of about 1,130,000. The mixer speed is again set at 80 rpm, and after about 1 minute, about 60 to about 70 weight percent of poly(ethylene glycol) methyl ether having a molecular weight of about 350 can be added to the Brabender and allowed to mix for another seven minutes or so at 80 rpm before finally adding about 1 to about 10 weight percent of lithium chloride and further mixing for another eight minutes or so, the lithium salt being completely dissolved in the mixed compound. This material is typically a sticky paste.

Without being bound by theory, it is believed that the ionically conductive additive, which is a polar compound, binds itself to the silica filler, which is also polar via polar-polar interactions, and therefore is generally believed to coat the silica sufficiently to provide electrical conductivity to the tire tread composition.

It will also be appreciated that the electrically conductive additives are particularly useful in tire tread compositions containing silica, although it is believed that the electrical conductivity of well-dispersed carbon black can also be improved. Typically, as in many tires, both silica and carbon black is employed. Where silica is employed, it is often customary to add a coupling agent, such as a silane to obtain good physical properties in a cured rubber stock containing silica as a filler. Often coupling agents are composed of a silane which has at least one first constituent component, or moiety, (such as a silane portion) capable of reacting with the silica surface and, also, an additional moiety capable of interacting with the rubber, particularly a sulfur vulcanizable rubber which contains carbon-to-carbon double bonds, or unsaturation. Usually the additional moiety is sulfur in a form of a polysulfide and particularly a polysulfide bridge between said first moieties. In this manner, then the coupler acts as a connecting bridge between the silica and the rubber and thereby enhances the rubber reinforcement aspect of the silica. The rubber-reactive group component, namely the said additional moiety, of such coupler may be, for example, one or more of groups such as mercapto, amino, vinyl, epoxy, and sulfur groups, preferably a sulfur or mercapto moiety and more preferably sulfur in a form of a polysulfide as a polysulfide bridge between at least two of said first moieties.

Numerous coupling agents and compatibilizing agents are known for use in combining silica and rubber. Among the silica-based coupling and compatibilizing agents particularly useful and preferred in the present invention include silane coupling and/or compatibilizing agents containing polysulfide components, or structures such as, for example, trialkoxyorganosilane polysulfides, such as for example bis-(3-trialkoxysilylorgano) polysulfides, containing from about 2 to about 8 sulfur atoms in a polysulfide bridge such as, for example, bis-(3-triethoxysilyipropyl) tetrasulfide (Si69) and those alkyl alkoxysilanes of the formula $(R_1)_2Si(OR_2)_2$ or $R_1Si(OR_2)_3$, wherein the alkoxy groups are the same or are different; each $R_1$ independently comprising C1 to about C18 aliphatic, about C6 to about C12 cyclo-aliphatic, or about C6 to about C18 aromatic, preferably C1 to about C10 aliphatic, about C6 to about C10 cyclo-aliphatic, or about C6 to about C12 aromatic; and each $R_2$ independently containing from one to about 6 carbon atoms. Representative examples include octyltriethoxy silane, octyltrimethyloxy silane, (3-glycidoxypropyl)trimethoxy silane, (3-glycidoxypropyl)triethoxy silane, hexyltrimethoxy silane, ethyltrimethyoxy silane, propyltriethoxy silane, phenyltrimethoxy silane, cyclohexyltrimethoxy silane, cyclohexyltriethyoxy silane, dimethyidimethyoxy silane, 3-chloropropyltriethoxy silane, methacryoltrimethoxy silane, i-butyltriethoxy silane, and the like. Of these, bis-(3-triethoxysilylpropyl) tetrasulfide (Si69) is preferred.

The present invention may alternatively utilize the presence of one or more processing aids with silica to replace the silane (Si69) to give equal processability of the vulcanizable compound, and lower hysteresis of the vulcanized stock, without loss of other measured physical properties. These processing aids include fatty acid esters of hydrogenated and non-hydrogenated $C_5$ and $C_6$ sugars, e.g., sorbitose, mannitose, and arabinose. These compounds have at least three hydroxyl groups and from one to 3.5 esters groups (sesqui esters). Also useful are the polyoxyethylene derivatives thereof. Representative examples include the sorbitan oleates, including monooleate, dioleate, trioleate, and sesquioleate, as well as the sorbitan esters of laurate, plamitate, and stearate fatty acids, and polyoxyethylene derivatives thereof. The filler-reinforced, elastomeric formulations of the present invention can be vulcanized or cured in a conventional manner with known vulcanizing agents of from about 0.2 to about 5 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents can be used alone or in combination.

In the sulfur cure system, when used in compositions of this invention, sulfur is preferably employed in amounts of about 0.2 phr to about 5 phr, more preferably in amounts of from about 0.5 phr to about 3 phr, and most preferably from about 1 to about 2 phr. In addition, the cure package may provide one or more accelerators or vulcanizing agents including, but not necessarily limited to, dithiocarbamate accelerators, including the metal dialkyldithiocarbamates such as, for example, zinc dibutyldithiocarbamate (ZDBDC), zinc diethyldithiocarbamate, zinc dimethyldithiocarbamate, and ferric dimethyldithiocarbamate; and thiazole accelerators including 2-mercaptobenzothiazole, the benzothiazole disulfides such as, for example, mercaptobenzothiazole disulfide (MBTS), and the benzothiazole sulfenamides, such as, for example, N-cyclohexyl-2-benzothiazole sulfenamide. Other useful accelerators which may be employed with the EPDM terpolymers include 2,2'-dibenzothiazyl disulfide, tetramethylthiuram disulfide, 4,4'-dithiomorpholine, dipentamethylene thiuram hexasulfide (DPTH), tetramethylthiuram monosulfide, tetramethylthiuram disulfide (TMTDS), N-tert-butyl-2-benzothiasulfenamide (TBBS), zinc 0,0' dibutylphosphorodithioate, and the like. Specific vulcanization systems may further depend upon how the composition is to be used. In addition, such systems will depend on the desired vulcanization conditions, e.g., vulcanization times, vulcanization temperatures, and vulcanizer pressure.

It will be appreciated that the foregoing accelerators are not exclusive, and that other vulcanizing agents known in the art to be effective in the curing of elastomers may also be utilized. For a list of additional vulcanizing agents, see *The Vanderbilt Rubber Handbook*, RT Vanderbilt Co., Norwalk, Conn. 06855 (1979).

The tire tread compositions of the present invention can be prepared by compounding or mixing the elastomer with a reinforcing filler such as silica, carbon black, or combinations thereof, the electrically conductive additive, and other conventional elastomer additives including additional fillers, plasticizers, antioxidants, antiozonants, processing oils, waxes, stearic acid, pigments and the like, using standard rubber mixing equipment such as a Brabender such that the maximum temperature is about 175° C. and remilling with some additional carbon black and a silane coupling agent, such as Si69, if needed, at a slightly lower maximum temperature (about 140° C.). Sulfur or other curatives, together with zinc oxide and any desirable accelerators can then be added at a temperature of about 110° C. and cured at about 165° C. for about 20 minutes. Although the foregoing procedure is preferred, it will be understood that any procedure known in the art suitable for producing the tire tread compositions of the present invention can be utilized.

Upon vulcanization of the filler-reinforced composition of the present invention, the composition can be shaped, molded or otherwise formed by various methods well known and readily apparent to those having skill in the tire production art for use on a tire carcass as a tire tread. In particular, the composite tread composition is generally applied to the tire carcass prior to curing and includes a tread pattern. The composite tread is applied to the tire carcass in such a manner as to provide a surface for engaging the road. The composite tire tread can provide for the dissipation of electrostatic charges that can accumulate in pneumatic tires and the like by passing the electrostatic charges through to the road surface. Notably, the tread composition of the present invention maintains its excellent physical properties, while also providing for improved snow and ice traction and maintaining excellent wet and dry traction and handling as found for many silica-filled tire tread compositions.

In order to demonstrate the practice of the present invention, the following examples have been prepared and tested as described in the Experimentation section disclosed hereinbelow. The examples should not, however, be viewed as limiting the scope of the invention. The claims will serve to define the invention.

GENERAL EXPERIMENTATION

In order to exemplify practice of the invention, silica-filled tread compositions suitable for use on tires according to the concepts of the present invention were prepared and subjected to testing for conductivity and physical proerties. The tire tread formulations are presented in Table I hereinbelow.

TABLE II

Silica Formulation with Conductive Polymer

| Compound No. | 1 | 2 | 3 | 4 | 5 | 6 |
|---|---|---|---|---|---|---|
| Styrene Butadiene Rubber | 75 | 75 | 75 | 75 | 75 | 75 |
| Natural Rubber | 25 | 25 | 25 | 25 | 25 | 25 |
| Carbon Black | 32 | 32 | 32 | 32 | 32 | 32 |
| Silica | 30 | 30 | 30 | 30 | 30 | 30 |
| Stearic Acid | 1.5 | 1.5 | 1.5 | 1.5 | 1.5 | 1.5 |
| Wax/oil | 16.5 | 16.5 | 16.5 | 16.5 | 16.5 | 16.5 |
| Antistatic additive, phr | 0 | 0.5 | 1 | 2 | 4 | 8 |
| Carbon Black/Silane Coupling Agent | 3/3 | 3/3 | 3/3 | 3/3 | 3/3 | 3/3 |
| Zinc Oxide | 2.5 | 2.5 | 2.5 | 2.5 | 2.5 | 2.5 |
| Sulfur | 1.7 | 1.7 | 1.7 | 1.7 | 1.7 | 1.7 |
| Accelerators | 2.25 | 2.25 | 2.25 | 2.25 | 2.25 | 2.25 |
| Salt | — | LiBF4 | LiBF4 | LiBF4 | LiBF4 | LiBF4 |
| M/EO | — | 0.054 | 0.054 | 0.054 | 0.054 | 0.054 |

Specifically, each sample was compounded using a conventional tire tread formulation which included a rubber blend of 75 parts by weight styrene-butadiene rubber (SBR) and 25 parts by weight natural rubber. An approxiamate 50/50 blend of carbon black and silica was used as the reinforcing fillers for the compounds. Compound No. 1 (the control) did not include any of the electrically conductive additive, while Compound Nos. 2–6 added various amounts ranging from 0.5 to 8 parts by weight of the electrically conductive additive, poly(methylvinyl ether-alt-maleic anhydride)-g-poly(ethylene glycol) methyl ether/lithium tetraflouroborate. This additive was synthesized by first adding about20 grams of poly(methylvinyl ether-alt-maleic anhydride), available from Aldrich and having a number average molecular weight of about 1,130,000, to a Brabender preheated to about 138.9° C. The rotor speed was set to about 80 rpm. After about 1 minute, about 48.8 grams of poly(ethylene glycol) monomethyl ether, also available from Aldrich and having a number average molecular weight of about 350, was added to the Brabender and allowed to mix for another six minutes at 80 rpm. After this, about 5 grams of lithium tetraflouroborate, $LiBF_4$, (Aldrich, 98%) was added and mixed in the Brabender for another eight minutes at 80 rpm to produce the resultant additive, a clear brown material. The mole ratio of lithium ions to the ethylene oxide monomers was calculated as 0.054.

The physical and electrical conductivity test results conducted on the compounds set forth in Table II are provided in Table III.

TABLE III

Physical Test Results of Silica Formulation

| Sample No. | 1 | 2 | 3 | 4 | 5 | 6 |
|---|---|---|---|---|---|---|
| Mooney Viscosity | | | | | | |
| ML 1 + 4/130° C. | 62.5 | 61.3 | 59.4 | 57.5 | 55.4 | 50.1 |
| T80 (sec.) | 8.5 | 8.1 | 8.1 | 7.7 | 7.4 | 7.1 |
| Monsanto Cure at 165° C. | | | | | | |
| ML (torq) | 2.64 | 2.74 | 2.68 | 2.51 | 2.47 | 2.14 |
| MH (torq) | 15.57 | 18.59 | 18.3 | 18.39 | 18.36 | 17.68 |
| Ts2 (min;sec) | 2;51 | 3;03 | 3;19 | 3;18 | 3;22 | 2;38 |
| Tc90 (min;sec) | 11;01 | 8;48 | 8;38 | 7;54 | 7;53 | 6;46 |
| tanδ at MH | 0.109 | 0.122 | 0.128 | 0.113 | 0.104 | 0.092 |
| Time to 175° F. in MB, mins | 5 | 4 | 4 | 3.75 | 3.75 | 3.83 |
| Ring Tensile at 24° C. | | | | | | |
| 50% Modulus, psi | 219 | 231 | 230 | 229 | 231 | 218 |
| 100% Modulus, psi | 431 | 453 | 455 | 454 | 456 | 426 |
| 200% Modulus, psi | 1076 | 1114 | 1122 | 1126 | 1098 | 1026 |
| 300% Modulus, psi | 1965 | 2000 | 2012 | 2020 | 1941 | 1812 |
| Tensile str., psi | 3144 | 2982 | 2832 | 2958 | 2844 | 2831 |
| % Elongation | 429 | 408 | 390 | 404 | 405 | 425 |
| Break energy, in-lbs/in$^3$ | 5807 | 5255 | 4789 | 5167 | 5048 | 5273 |
| Ring Tensile at 100° C. | | | | | | |
| 50% Modulus, psi | 180 | 180 | 183 | 186 | 178 | 183 |
| 100% Modulus, psi | 356 | 364 | 371 | 370 | 356 | 360 |
| 200% Modulus, psi | 888 | 920 | 921 | 930 | 885 | 882 |
| Tensile Str., psi | 1504 | 1394 | 1272 | 1433 | 1254 | 1530 |
| % Elongation | 287 | 267 | 248 | 272 | 257 | 302 |
| Break energy, in-lbs/in$^3$ | 1822 | 1579 | 1373 | 1683 | 1398 | 2045 |
| Ring Tear at 171° C., ppi | 111 | 113 | 102 | 109 | 90.9 | 99.9 |
| Pendulum Rebound at 24° C. | 42.8 | 42 | 42.2 | 42 | 41.6 | 42.8 |
| Pendulum Rebound at 65° C. | 53.2 | 54.2 | 54.8 | 54.4 | 54.2 | 54.8 |
| New Lambourn at 65%, g lost | 0.1409 | 0.1474 | 0.1477 | 0.1349 | 0.1394 | 0.148 |
| New Lambourn at 65%, INDEX | 1.00 | 0.96 | 0.95 | 1.04 | 1.01 | 0.95 |
| Wet Stanley London (#/std) | 56 | 58 | 56 | 59 | 57 | 58 |
| Shore A, at RT (peak) | 69 | 70.7 | 70.1 | 69.8 | 71.1 | 69.5 |
| Dispersion Index #1, % | 88.4 | 94.7 | 85.7 | 93.7 | 96.5 | 88 |
| Rheometrics at 3.14 rad/sec | | | | | | |
| tanδ at 7% Elongation and 24° C. | 0.177 | 0.1734 | 0.1705 | 0.1775 | 0.171 | 0.1679 |
| G (MPa) at 7% Elongation and 24° C. | 0.616 | 0.611 | 0.648 | 0.653 | 0.618 | 0.627 |
| ΔG' (MPa) at 24° C. | 4.059 | 3.773 | 4.075 | 4.119 | 3.647 | 3.734 |
| G' (MPa) at 14.5% Elongation and 24° C. | 2.72 | 2.838 | 3.064 | 2.985 | 2.919 | 2.99 |
| G' (MPa) at 14.5 Elongation and 24° C. | 2.72 | 2.838 | 3.064 | 2.985 | 2.919 | 2.99 |
| tanδ at 7% Elongation and 65° C. | 0.125 | 0.1221 | 0.1214 | 0.1221 | 0.1168 | 0.1181 |
| G (MPa) at 7% Elongation and 65° C. | 0.361 | 0.348 | 0.364 | 0.357 | 0.341 | 0.348 |
| ΔG' (MPa) at 65° C. | 2.338 | 2.44 | 2.616 | 2.432 | 2.335 | 2.403 |
| G' (MPa) at 14.5% Elongation and 65° C. | 2.435 | 2.454 | 2.556 | 2.511 | 2.507 | 2.465 |
| Volume Resistivity Model 803B Probe on 0.1" slab | | | | | | |
| Electric Resistance, ohm | 1.40E+09 | 4.70E+08 | 3.00E+08 | 3.50E+08 | 100E+08 | 2.10E+07 |
| Average thickness, in | 0.106 | 0.109 | 0.106 | 0.108 | 0.110 | 0.107 |
| Volume Resistivity ohm-cm | 3.24E+10 | 1.05E+10 | 6.94E+09 | 7.91E+09 | 2.22E+09 | 4.79E+08 |

Based upon the results of the tests conducted as set forth in Table III, it will be appreciated that the silica-filled tire tread formulations of the present invention containing a poly(alkylene oxide) ester compound having a alkali metal salts dissolved therein showed improved electrical conductivity by as much as about two orders of magnitude for sample of similar thickness. The conductivity of the samples can be determined as the reciprocal of the volume resistivity as shown in Table III (1/ohm-cm). Upon close analysis of the rheometrics, it is also clear that the addition of the additive provided for better dispersion of the silica and carbon black throughout the compounded samples, while maintaining essentially the same physical characteristics with respect to viscosity, modulus, and Shore A hardness, as the compound (No.1) which did not employ any electrically conductive additive.

In conclusion, it should be clear from the foregoing tests and specification that a tire which has a composite tread structure of the type disclosed herein effectively dissipates electrostatic charges that may build up in a tire while still enhancing wet and dry handling performance and traction as well as wear of the tire, and further reducing hysteresis.

Thus, it should be evident that the composite tread of the present invention is highly effective in dissipating electrostatic charge or preventing the accumulation of such in tires. The invention is particularly suited for use on pneumatic tires, radial and bias, but is not necessarily limited thereto.

Based upon the foregoing disclosure, it should now be apparent that the use of the composite tread structure described herein will carry out the objects set forth hereinabove. It is therefore to be understood that any variations evident fall within the scope of the claimed invention and thus, the selection of specific component elements can be determined without departing from the spirit of the invention herein disclosed and described. In particular, rubber compositions of the present invention are not necessarily limited to those noted hereinabove. Other compositions of rubber having similar physical properties to those described above may be substituted therefor. Thus, the scope of the invention shall include all modifications and variations that may fall within the scope of the attached claims.

What is claimed is:

1. A tire tread composition having improved electrical conductivity properties comprising:
    100 parts by weight of a vulcanizable elastomer suitable for use in a tire;
    from about 1 to about 100 parts by weight of a silica reinforcing filler, per 100 parts of said elastomer; and
    from about 0.1 to about 15 parts by weight of an electrically conductive additive containing a poly(alkylene oxide)-containing polymer having an alkali metal salt dissolved in said polymer, per 100 parts of said elastomer.

2. The tire tread composition, as set forth in claim 1, further comprising from about 1 to about 80 parts by weight carbon black.

3. The tire tread composition, as set forth in claim 1, wherein said elastomer includes a diene monomer, homopolymer or a copolymer or terpolymer of a diene monomer and a monomer selected from the group consisting of a monovinyl aromatic monomer and a triene monomer.

4. The tire tread composition, as set forth in claim 1, wherein said elastomer includes a copolymer of at least one diene and at least one monovinyl aromatic monomer.

5. The tire tread composition, as set forth in claim 1, wherein said elastomer includes styrene butadiene rubber.

6. The tire tread composition, as set forth in claim 1, wherein said composition includes natural rubber.

7. The tire tread composition, as set forth in claim 1, wherein said electrically conductive additive is selected from the group consisting of comb polymers having poly(alkylene oxide) side chains, said polymers having an alkali metal salt dissolved in.

8. The tire tread composition, as set forth in claim 7, wherein said electrically conductive additive has a number average molecular weight of at least 100,000.

9. The tire tread composition, as set forth in claim 1, wherein said poly(alkylene oxide)-containing polymer is a vinyl end-capped poly(alkylene oxide) copolymer.

10. The tire tread composition, as set forth in claim 1, wherein said poly(alkylene oxide)-containing polymer is a grafted polymer containing poly(alkylene oxide).

11. The tire tread composition, as set forth in claim 10, wherein said grafted polymer includes the reaction product of a poly(alkylene oxide)-containing polymer selected from the group consisting of monohydroxy poly(alkylene oxide) polymers and aziridine end-capped poly(alkylene oxide) polymers and a maleic anhydride-containing polymer.

12. The tire tread composition, as set forth in claim 11, wherein said monohydroxy poly(alkylene oxide) polymers are selected from the group consisting of poly(ethylene oxide), poly(propylene oxide), poly(tetrahydrofuran) and block and random copolymers thereof, and aliphatic and aromatic ether derivatives and fatty acid ester derivatives thereof.

13. The tire tread composition, as set forth in claim 11, wherein said poly(alkylene oxide)-containing polymer, prior to reaction with said maleic anhydride-containing polymer, has a number average molecular weight of between about 100 and about 20,000.

14. The tire tread composition, as set forth in claim 11, wherein said maleic anhydride-containing polymer is selected from the group consisting of poly(akylvinylether-co-maleic anhydride), poly(styrene-co-maleic anhydride), poly(substituted styrene-co-maleic anhydride), and poly($\alpha$-olefin-co-maleic anhydride).

15. The tire tread composition, as set forth in claim 14, wherein said maleic anhydride constitutes at least 10 weight percent of said maleic anhydride-containing polymer.

16. The tire tread composition, as set forth in claim 11, wherein said maleic anhydride-containing polymer, prior to reaction with said poly(alkylene oxide)-containing polymer, has a number average molecular weight of at least 100,000.

17. The tire tread composition, as set forth in claim 1, wherein said alkali metal salt is a lithium salt.

18. The tire tread composition, as set forth in claim 17, wherein said alkali metal salt is selected from the group consisting of $LiBF_4$ and LiCl.

19. The tire tread composition, as set forth in claim 1, wherein the mole ratio of cations from said alkali metal salt to monomers of alkylene oxide is from about 0.01 to about 0.2.

20. The tire tread composition, as set forth in claim 1, wherein said electrically conductive additive is selected from the group consisting of poly(methylvinyl ether-alt-maleic anhydride)-g-poly(ethylene glycol) methyl ether/lithium tetraflouroborate and poly(methylvinyl ether-alt-maleic anhydride)-g-poly(ethylene glycol) methyl ether/lithium chloride.

21. A tire having improved electrostatic dissipation employing a tire tread composition comprising:
    100 parts by weight of a vulcanizable elastomer suitable for the manufacture of tread composition for a tire;

from about 1 to 100 parts by weight of a silica reinforcing filler, per 100 parts of said elastomer; and from about 0.1 to 15 parts by weight of an electrically conductive additive containing a poly(alkylene oxide)-containing polymer having an alkali metal salt dissolved in said polymer, per 100 parts of said elastomer.

22. A method of dissipating electrostatic charge from tires comprising the step of:

applying to the tire carcass prior to curing, a composite tread, said tread providing a tread pattern and having a road engaging surface, said composite tread comprising:

100 parts by weight of a vulcanizable elastomer suitable for the manufacture of tread composition for a tire;

from about 1 to 100 parts by weight of a silica reinforcing filler, per 100 parts of said elastomer; and from about 0.1 to 15 parts by weight of an electrically conductive additive containing a poly(alkylene oxide)-containing polymer having an alkali metal salt dissolved in said polymer, per 100 parts of said elastomer, whereby at least a portion of said tread is engaged with roadway surfaces encountered during use of the tire to dissipate the electrostatic charge.

* * * * *